United States Patent
Matthews et al.

(10) Patent No.: US 11,570,127 B1
(45) Date of Patent: Jan. 31, 2023

(54) REDUCING POWER CONSUMPTION IN AN ELECTRONIC DEVICE

(71) Applicant: Innovium, Inc., San Jose, CA (US)

(72) Inventors: William Brad Matthews, San Jose, CA (US); Puneet Agarwal, Cupertino, CA (US)

(73) Assignee: Innovium, Inc., San Jose, CA (US)

( * ) Notice: Subject to any disclaimer, the term of this patent is extended or adjusted under 35 U.S.C. 154(b) by 0 days.

(21) Appl. No.: 17/519,225

(22) Filed: Nov. 4, 2021

Related U.S. Application Data (63) Continuation of application No. 16/234,744, filed on Dec. 28, 2018, now Pat. No. 11,171,890, which is a continuation of application No. 16/234,697, filed on Dec. 28, 2018, now Pat. No. 11,159,455.

(51) Int. Cl.
  *H04L 49/90* (2022.01)
  *H04L 49/101* (2022.01)
  *H04L 47/32* (2022.01)
  *H04L 47/215* (2022.01)
  *H04L 47/22* (2022.01)

(52) U.S. Cl.
  CPC ........ *H04L 49/9084* (2013.01); *H04L 47/215* (2013.01); *H04L 47/22* (2013.01); *H04L 47/32* (2013.01); *H04L 49/101* (2013.01)

(58) Field of Classification Search
  None
  See application file for complete search history.

(56) References Cited

U.S. PATENT DOCUMENTS

| | | | | |
|---|---|---|---|---|
| 5,894,481 A | * | 4/1999 | Book | H04Q 11/0421 710/52 |
| 5,940,370 A | * | 8/1999 | Curtis | H04Q 3/0066 370/231 |
| 6,408,058 B1 | * | 6/2002 | Lanet | H04M 11/066 379/93.19 |
| 6,483,841 B1 | * | 11/2002 | Chang | H04L 9/40 370/413 |
| 6,741,559 B1 | * | 5/2004 | Smeulders | H04L 49/3054 370/229 |

(Continued)

OTHER PUBLICATIONS

U.S. Appl. No. 17/521,475, entitled "Reducing Power Consumption in an Electronic Device," filed Nov. 8, 2021.

*Primary Examiner* — Andrew C Oh (57) ABSTRACT

An ingress packet processor in a device corresponds to a group of ports and receives network packets from ports in its port group. A traffic manager in the device manages buffers storing packet data for transmission to egress packet processors. An ingress arbiter is associated with a port group and connects the port group to an ingress packet processor coupled to the ingress arbiter. The ingress arbiter determines a traffic rate at which the associated ingress packet processor transmits packets to the traffic manager. The ingress arbiter controls an associated traffic shaper to generate a number of tokens that are assigned to the port group. Upon receiving packet data from a port in the group, the ingress arbiter determines, using information from the traffic shaper, whether a token is available. Conditioned on determining that a token is available, the ingress arbiter forwards the packet data to the ingress packet processor.

20 Claims, 4 Drawing Sheets

(56) References Cited

U.S. PATENT DOCUMENTS

| | | | |
|---|---|---|---|
| 6,952,728 B1* | 10/2005 | Alles | H04L 12/2876 709/224 |
| 7,240,175 B1* | 7/2007 | Maitland | H04L 45/7453 710/316 |
| 8,804,751 B1* | 8/2014 | Poole | H04L 49/90 370/413 |
| 8,976,667 B1* | 3/2015 | Dropps | H04L 47/30 370/235 |
| 9,154,255 B2* | 10/2015 | Beshai | H04Q 11/0005 |
| 10,313,103 B1* | 6/2019 | Perras | H04B 10/516 |
| 10,447,597 B1* | 10/2019 | Kim | H04L 47/17 |
| 10,505,851 B1 | 12/2019 | Matthews et al. | |
| 10,652,154 B1 | 5/2020 | Matthews et al. | |
| 10,735,339 B1 | 8/2020 | Matthews et al. | |
| 10,742,558 B1 | 8/2020 | Matthews et al. | |
| 11,140,078 B1* | 10/2021 | Gangam | H04L 45/748 |
| 11,159,455 B1 | 10/2021 | Matthews et al. | |
| 11,171,890 B1 | 11/2021 | Matthews et al. | |
| 2001/0007560 A1 | 7/2001 | Masuda et al. | |
| 2001/0039576 A1 | 11/2001 | Kanada | |
| 2002/0085578 A1 | 7/2002 | Dell et al. | |
| 2002/0118692 A1 | 8/2002 | Oberman et al. | |
| 2002/0126634 A1 | 9/2002 | Mansharamani et al. | |
| 2002/0126669 A1 | 9/2002 | Tuck et al. | |
| 2002/0126671 A1 | 9/2002 | Ellis et al. | |
| 2003/0026205 A1 | 2/2003 | Mullendore et al. | |
| 2003/0026206 A1 | 2/2003 | Mullendore et al. | |
| 2003/0107996 A1 | 6/2003 | Black et al. | |
| 2003/0108058 A1 | 6/2003 | Black et al. | |
| 2003/0174649 A1 | 9/2003 | Shankar et al. | |
| 2004/0088439 A1* | 5/2004 | Lee | H04L 69/12 709/250 |
| 2004/0109412 A1 | 6/2004 | Hansson et al. | |
| 2004/0151123 A1* | 8/2004 | Lau | H04L 69/324 370/252 |
| 2004/0218592 A1 | 11/2004 | Nagar et al. | |
| 2004/0218617 A1 | 11/2004 | Sagfors | |
| 2005/0060295 A1* | 3/2005 | Gould | H04L 63/1425 |
| 2005/0083845 A1 | 4/2005 | Compton et al. | |
| 2005/0100020 A1 | 5/2005 | Hata et al. | |
| 2005/0111362 A1* | 5/2005 | Freytsis | H04L 47/564 370/235 |
| 2006/0045008 A1 | 3/2006 | Sun et al. | |
| 2006/0087989 A1 | 4/2006 | Gai et al. | |
| 2006/0098681 A1 | 5/2006 | Cafiero et al. | |
| 2006/0165112 A1 | 7/2006 | Varma | |
| 2006/0195603 A1 | 8/2006 | Seungdong | |
| 2006/0215558 A1 | 9/2006 | Chow | |
| 2006/0251067 A1 | 11/2006 | Desanti et al. | |
| 2006/0268871 A1 | 11/2006 | Van | |
| 2007/0070895 A1 | 3/2007 | Narvaez | |
| 2007/0112826 A1* | 5/2007 | Laksono | G11B 20/00007 707/999.102 |
| 2007/0195761 A1 | 8/2007 | Tatar et al. | |
| 2007/0248005 A1 | 10/2007 | Pan et al. | |
| 2007/0282951 A1 | 12/2007 | Selimis et al. | |
| 2008/0034267 A1* | 2/2008 | Hou | H04L 1/0072 714/752 |
| 2008/0198750 A1 | 8/2008 | Huang et al. | |
| 2008/0298240 A1 | 12/2008 | Lee et al. | |
| 2009/0010165 A1 | 1/2009 | Kim et al. | |
| 2009/0245104 A1 | 10/2009 | Nishimura et al. | |
| 2009/0292575 A1 | 11/2009 | Ellebracht et al. | |
| 2009/0296582 A1 | 12/2009 | Shi et al. | |
| 2009/0300296 A1 | 12/2009 | Yasui et al. | |
| 2010/0165995 A1* | 7/2010 | Mehta | H04L 45/04 370/400 |
| 2010/0228872 A1* | 9/2010 | Diab | H04L 69/323 709/230 |
| 2010/0293312 A1 | 11/2010 | Sonnier et al. | |
| 2011/0051604 A1 | 3/2011 | Nishimura | |
| 2011/0087915 A1 | 4/2011 | Zhang et al. | |
| 2011/0122691 A1 | 5/2011 | Sprouse | |
| 2011/0129223 A1 | 6/2011 | Yoo et al. | |
| 2011/0176554 A1 | 7/2011 | Yamada et al. | |
| 2011/0208951 A1 | 8/2011 | Hilker | |
| 2011/0235509 A1 | 9/2011 | Szymanski | |
| 2011/0255549 A1* | 10/2011 | Nakamura | H04L 12/417 370/401 |
| 2012/0093034 A1 | 4/2012 | Kamath et al. | |
| 2012/0106365 A1* | 5/2012 | Terry | H04L 43/0852 370/252 |
| 2012/0213078 A1 | 8/2012 | Kitada | |
| 2013/0045009 A1* | 2/2013 | Beshai | H04Q 11/0005 398/49 |
| 2013/0182716 A1* | 7/2013 | Gemelli | H04L 49/30 370/419 |
| 2013/0336129 A1* | 12/2013 | Shanmugam | H04L 43/0811 370/241.1 |
| 2014/0043987 A1* | 2/2014 | Watve | H04L 41/5019 370/252 |
| 2014/0092922 A1* | 4/2014 | Le Pallec | H04L 43/50 370/503 |
| 2014/0098684 A1* | 4/2014 | Diab | H04L 43/087 370/252 |
| 2015/0215176 A1* | 7/2015 | Johansson | H04L 43/04 370/250 |
| 2016/0294721 A1* | 10/2016 | Varadarajan | H04L 41/40 |
| 2016/0320967 A1* | 11/2016 | Kostic | G06F 13/28 |
| 2017/0078219 A1* | 3/2017 | Connor | H04L 45/22 |
| 2018/0026902 A1* | 1/2018 | Tang | H04L 49/9047 370/392 |
| 2018/0152365 A1* | 5/2018 | Belter | H04L 43/0858 |
| 2019/0052565 A1* | 2/2019 | Modi | H04L 43/0852 |

\* cited by examiner

REDUCING POWER CONSUMPTION IN AN ELECTRONIC DEVICE

CROSS-REFERENCE TO RELATED APPLICATIONS

This application is a continuation of U.S. application Ser. No. 16/234,744, filed Dec. 28, 2018, which is a continuation of U.S. application Ser. No. 16/234,697, filed Dec. 28, 2018, now U.S. Pat. No. 11,159,455, issued Oct. 26, 2021. The complete disclosures of all of the above patent applications are hereby incorporated by reference in their entirety for all purposes.

BACKGROUND

This specification relates to reducing power consumption in an electronic device.

Some electronic devices receive network packets through ingress ports of the devices, for forwarding through egress ports of the devices. In some cases, an electronic device temporarily stores packet data in buffers, before the packet data are forwarded to packet queues for transmission through the egress ports to external destinations.

SUMMARY

This specification describes packet processing in an electronic device having a number of innovative aspects and related technologies. The electronic device includes one or more ingress ports for receiving network traffic as packets, the ingress ports divided into one or more groups of ingress ports, where each ingress port group is connected to an ingress packet processor. The electronic device also includes one or more egress ports for transmitting network traffic as packets towards the intended destinations, the egress ports divided into one or more groups of egress ports, where each egress port group is connected to an egress packet processor. An ingress port in this context corresponds to a transmission channel that is associated with a source device, while an egress port corresponds to a transmission channel that is associated with a destination device. Different ingress and egress ports are associated with different transmission channels and the different ports process data for different destinations. For each egress packet processor, the electronic device includes one or more dedicated packet queues, which may also referred to as egress queues or egress buffers, in memory for temporarily storing packet data to be transmitted through egress ports coupled to the egress packet processor.

The electronic device includes one or more traffic managers for managing the writing of packet data to the packet queues. Each traffic manager includes and manages one or more memory buffers (also referred to simply as buffers) to temporarily store packet data that are to be sent to packet queues, for forwarding through an egress port group coupled to an egress packet processor. A traffic manager receives packet data from the ingress ports in units of data segments, which are referred to as cells, where a packet is composed of one or more cells. A crossbar, which interconnects the ingress packet processors to the traffic managers, broadcasts packet data from the ingress packet processors to all traffic managers in parallel. Each traffic manager reads state information provided along with each cell of packet data to determine if packet data incoming in the next cycle should be written to buffers managed by the traffic manager. By analyzing the state information for all the cells broadcast by the crossbar, each packet manager independently computes the total amount data, e.g., total number of cells, to be written across all the traffic managers in the next cycle.

In some implementations, each traffic manager compares the total amount of data to be written in the next cycle to one or more threshold levels. When the amount of data exceeds the one or more threshold levels, the traffic manager drops—instead of storing in buffers managed by the traffic manager—cells of some packets that are destined for egress ports corresponding to the buffers managed by the traffic manager. In some implementations, a traffic manager selectively drops cells of particular packet types while storing cells of other packet types. In some implementations, each traffic manager independently determines how many cells to drop, or cells of which packet types to drop, or both.

In some implementations, the electronic device also includes one or more ingress arbiters with traffic shapers, with each ingress arbiter connecting one of the ingress port groups to the corresponding ingress packet processor. Each ingress arbiter determines a traffic rate at which the corresponding ingress packet processor transmits packet data to the traffic managers. Depending on the traffic rate, the corresponding traffic shaper generates a bucket of tokens that are allocated to manage the data rate of the corresponding group of ingress ports connected to the ingress arbiter. Upon receiving cells of a packet from an ingress port, the ingress arbiter determines, by querying its traffic shaper, whether a token is available for the ingress port group. If a token is available, then the ingress arbiter schedules the received cell for forwarding to the corresponding ingress packet processor. However, if a token is not available, then the traffic shaper prevents the ingress arbiter from scheduling new cells to be forwarded to the corresponding ingress packet processor, leading to the cells either being dropped, or temporarily stored in an input buffer until a token becomes available or a timer expires, whichever occurs first.

The subject matter described in this specification can be realized in particular implementations so as to achieve one or more of the following advantages. Managing storage of cells in buffers by the traffic managers by comparison to threshold levels helps to reduce power consumption in the electronic device. Reduction in the power consumption can be realized both dynamically and statically by allowing each traffic manager to drop cells of selected traffic types by comparison to one or more of multiple threshold levels in each cycle. Enabling each traffic manager to independently determine the total amount of packet data to be received and which cells to drop leads to a distributed implementation in the electronic device. Using the traffic shapers and the corresponding token bucket system to limit packet processing further helps to manage power consumption based on switching.

The details of one or more implementations are set forth in the accompanying drawings and the description below. Other features, aspects, and advantages will become apparent from the description, the drawings, and the claims.

BRIEF DESCRIPTION OF THE DRAWINGS

Like reference numbers and designations in the various drawings indicate like elements. Various embodiments shown in the figures are merely illustrative representations and are not necessarily drawn to scale.

DETAILED DESCRIPTION

Figure 1:
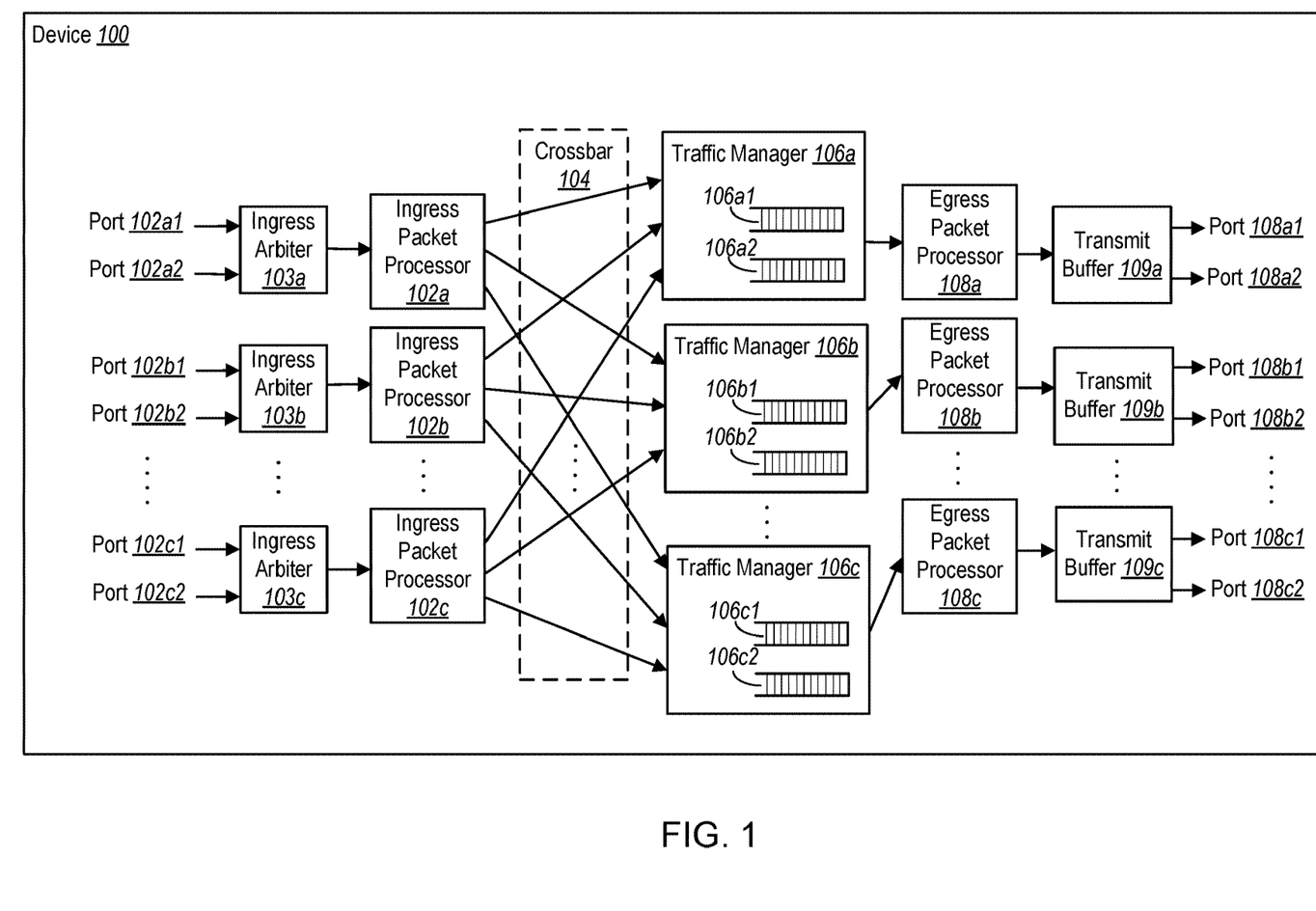
FIG. 1 illustrates an example electronic device that includes traffic managers.

FIG. 1 illustrates an example electronic device 100 that includes e.g. Traffic managers 106a, 106b and 106c. The electronic device 100 also includes ingress ports, ingress arbiters to which the ingress ports are connected, and corresponding ingress packet processors, e.g., ingress ports 102a1 and 102a2 connected to ingress arbiter 103a, which receives packets from ingress ports 102a1 and 102a2 and forwards interleaved packets to ingress packet processor 102a; ingress ports 102b1 and 102b2 connected to ingress arbiter 103b, which receives packets from ingress ports 102b1 and 102b2 and forwards interleaved packets to ingress packet processor 102b; and ingress ports 102c1 and 102c2 connected to ingress arbiter 103c, which receives packets from ingress ports 102c1 and 102c2 and forwards interleaved packets to ingress packet processor 102c. A crossbar 104 in the electronic device 100 connects the ingress packet processors to the traffic managers. The ingress packet processors operate on packets serially. The electronic device 100 also includes egress packet processors 108a, 108b and 108c, and corresponding transmit buffers 109a, 109b and 109c, respectively, which connect the egress packet processors to groups of egress ports. For example, egress packet processor 108a is connected through transmit buffer 109a to egress ports 108a1 and 108a2; egress packet processor 108b is connected through transmit buffer 109b to egress ports 108b1 and 108b2; and egress packet processor 108c is connected through transmit buffer 109c to egress ports 108c1 and 108c2.

Each traffic manager includes one or more buffers to store packet data, e.g., cells, that are to be sent either to packet queues (e.g., upon arrival of the last cell for the packet), or to egress packet processors (e.g., in case of cut-through traffic), e.g. traffic manager 106a includes buffers 106a1 and 106a2; traffic manager 106b includes buffers 106b1 and 106b2; and traffic manager 106c includes buffers 106c1 and 106c2. Traffic manager 106a forwards cells stored in the buffers 106a1 or 106a2, or both, to the egress packet processor 108a to which it is connected, for transmitting through one or more egress ports in the group of ports coupled to the egress packet processor 108a, e.g., egress ports 108a1 or 108a2, or both. Similarly, traffic manager 106b forwards cells stored in the buffers 106b1 or 106b2, or both, to the egress packet processor 108b, for transmitting through one or more egress ports, e.g., egress ports 108b1 or 108b2, or both, in the group of ports coupled to the egress packet processor 108b; and traffic manager 106c forwards cells stored in the buffers 106c1 or 106c2, or both, to the egress packet processor 108c, for transmitting through one or more egress ports, e.g., egress ports 108c1 or 108c2, or both, in the group of ports coupled to the egress packet processor 108c.

In some implementations, the electronic device 100 is a portion of a network device e.g., a network switch e.g., an Ethernet switch that includes data sources. In some other implementations, the electronic device 100 is a network device, e.g., network switch or network interface card (NIC), and data sources are external to the network switch. In either case, the electronic device 100 performs forwarding operations on packet data at very high speeds, e.g., potentially on the order of tens of thousands of bits per second (bps), with high efficiency, e.g., minimum buffering and no buffer overflow in the device. In some other implementations, the electronic device 100 is a general-purpose processing unit or a storage device.

The traffic manager, ingress packet processors, egress packet processors, buffers, packet queues and port groups described in this specification can be implemented in a number of technologies. For example, a buffer or a packet queue includes components that can be implemented using combinational logic circuitry, e.g., logic gates, flip-flops and registers. A buffer or a packet queue also includes memory components that can be implemented using memory chips or be fabricated on one integrated circuit with the rest of the transmit buffer. The traffic manager logic can be implemented as a programmed microprocessor, a programmed microcontroller, an application-specific integrated circuit (ASIC), or a programmed processor core or set of processor cores on a larger integrated circuit. A port group can include physical ports or logical ports. A port group includes a set of serializer/deserializer (SERDES) lanes operating at a particular rate, e.g., 10 Gbps, 25 Gbps, 50 Gbps, or 100 Gbps each. A physical port is associated with one or more SERDES lanes. For example, a 100 Gbps port can be associated with ten 10 Gbps lanes, four 25 Gbps lanes, two 50 Gbps lanes, or one 100 Gbps lane, depending on the underlying SERDES technology used. Similar to a physical port, a logical port is also associated with a destination; however, a logical port includes multiple physical connections to the destination. A logical port can be implemented as one or more physical ports. A logical port can be bound to one or more aggregate port buffers. A crossbar is a set of wires that interconnect the ingress packet processors to traffic managers. The Wires can be entirely internal to the device, span multiple devices, or a hybrid in which some ingress packet processors and traffic managers are connected using internal wires only, while other ingress packet processors and traffic managers are connected using wires that span multiple devices. This specification will describe operations performed by these and related components in various implementations of the components, and refer to the components as being "configured to" perform the operations. This should be understood to mean that the components include hardware, firmware, software, circuitry, or a combination of them that in operation cause the components to perform the operations.

In some implementations, each group of egress ports is associated with different destinations. In some implementations, a destination is another electronic device, e.g., another Ethernet switch, or a peripheral device, e.g., a packet processor.

Network traffic packets for various communications channels are received at the electronic device 100 through one or more ingress ports 102a1, 102a2, 102b1, 102b2, 102c1 and 102c2, for forwarding towards their respective destinations through one or more egress ports in the egress ports 108a1, 108a2, 108b1, 108b2, 108c1 and 108c2. While waiting to be transmitted through the egress ports, the cells of packet data are temporarily stored in the buffers, before being sent to packet queues corresponding to the target egress ports. The traffic managers 106a, 106b and 106c manage storage of the packet data in the buffers in units of cells.

The ingress packet processors in the electronic device 100, e.g., ingress packet processors 102a, 102b and 102c, receive packets from various external data sources through the ingress ports, via the respective ingress arbiters that are coupled to respective ingress packet processors. The crossbar 104 receives packet data from the ingress packet processors and broadcasts the cells of packet data to all the traffic managers in parallel. State information is included with each cell, which provides information on the target egress port through which the corresponding packet is to be transmitted. Each traffic manager determines, by reading the state information provided along with each cell, which cells are to be written to buffers managed by the traffic manager.

A traffic manager determines that a cell is to be written to a buffer managed by the traffic manager when the packet corresponding to the cell is destined to be transmitted through an egress port connected to the traffic manager. For example, traffic manager 106a receives all cells broadcast by the crossbar 104. Upon reading the state information provided with each cell, traffic manager 106a determines that some cells belong to packets that are to be transmitted through egress port 108a1, or 108a2, or both, while the remaining cells correspond to packets that are to be transmitted through egress ports in other port groups. The traffic manager 106a accordingly determines that the cells belonging to packets that are to be to be transmitted through egress port 108a1 or 108a2 or both, are to be written to buffers managed by the traffic manager 106a, while the remaining cells, which are destined for egress ports managed by other traffic managers, can be dropped upon reading their state information to compute the total amount of data to be written, as described below.

Since the crossbar 104 broadcasts the packet data with state information to all the traffic managers, each traffic manager determines, upon reading the state information for all the cells, the total amount of data to be written, which includes the cells that are to be written to buffers managed by the traffic manager, and the cells that are to be written to buffers managed by other traffic managers, before the cells are sent either to the egress packet processors, or linked to packet queues upon arrival of the last cell. For example, each of traffic managers 106a, 106b and 106c receives all the packet data cells broadcast by the crossbar 104. Traffic manager 106a determines, by reading the state information from all the cells: (i) which of these cells are to be written to buffers managed by the traffic manager, e.g., buffers 106a1 or 106a2, or both, and (ii) the total amount of data to be written to all the buffers across all the traffic managers, e.g., buffers 106a1, 106a2, 106b1, 106b2, 106c1 and 106c2. Similarly, each of traffic managers 106b and 106c determines, from the state information provided with all the cells broadcast by the crossbar 104: (i) which of these cells are to be written to buffers managed by the traffic manager, e.g., buffers 106b1 or 106b2, or both, managed by traffic manager 106b, or buffers 106c1 or 106c2, or both, managed by traffic manager 106c, and (ii) the total amount of data to be written to all the buffers across all the traffic managers.

Since all the traffic managers receive the same cells that are broadcast by the crossbar 104, each traffic manager gets an identical view of the packet data. Accordingly, the total amount of data computed by each traffic manager is the same. In this manner, each traffic manager independently determines, using a distributed approach, the total amount of data to be written across all the buffers.

When a traffic manager writes packet data to a buffer, device power is consumed. The consumption of power can be high, e.g., for high data rate traffic or a large number of traffic sessions, in which the traffic managers write a large amount of cells to the buffers. For example, if there are N traffic managers, each writing M cells per clock cycle, the total number of write operations in a clock cycle is N×M. N and M are both integers greater than zero. For a large N, or a large M, or both, the total power consumed in write operations to the buffers can be high, which can be a major portion of the energy expenditure by the electronic device 100.

In some implementations, the total energy consumed by the traffic managers in writing to the respective buffers is controlled to be within certain budgeted values by limiting the total number of writes that are performed across all the traffic managers in a clock cycle. For example, in some implementations, the electronic device 100 is configured such that the total number of write operations per clock cycle across all traffic managers is limited to a value that is set to limit the total energy consumed by the traffic managers in performing write operations within the budgeted values. In such implementations, each traffic manager independently determines which cells to drop, as described in greater detail below.

As noted above, each traffic manager determines, based on the information broadcast by the crossbar 104 to all the traffic managers, (i) the cells that are to be written to buffers managed by the traffic manager, and (ii) the total amount of data to be written to all the buffers across all the traffic managers. Each traffic manager compares the total amount of data to be written across all the traffic managers, represented as a total number of write operations, to a predetermined threshold level, e.g., a preselected number of write operations; if the traffic manager determines that the total amount of data to be written exceeds the threshold level, then the traffic manager decides to drop some of the cells it could write to buffers managed by the traffic manager.

In some implementations, each traffic manager determines the number of cells to drop such that the total amount of data to be written across all the traffic managers becomes less than the threshold level. In other implementations, each traffic manager determines the number of cells to drop such that a prorated share of its contribution to the total amount of data to be written across all the traffic managers becomes less than the threshold level. In some implementations, a traffic manager considers several factors to determine whether to accept or drop cells. This factors include the type of packet (e.g., unicast, multicast, unicast with additional copies, multicast with additional copies, among others); the destination type (e.g., central processing unit (CPU) or front panel port, among others); the packet source type (e.g., CPU or front panel port, among others); source port and destination port; current drop state of the packet queue to which the cell will be linked (for unicast traffic); and drop rate from a given source or destination (e.g., based on previous drops to provide fairness).

As an illustrative example, in a clock cycle, each of traffic managers 106a, 106b and 106c receives, from the crossbar 104, information about cells that are to be written to the buffers across the traffic managers, e.g., Traffic manager 106a determines, by analyzing this information, that the total number of write operations across all traffic managers 106a, 106b and 106c exceeds the threshold level by 12 cells. Each of the other traffic managers 106b and 106c independently determines the same thing. In some implementations, in response to such a determination, traffic manager 106a drops 12 cells from the number of cells that were to be written to the buffers 106a1 and 106a2. Similarly, each of the other traffic managers 106b and 106c independently drops 12 cells from the respective cells that were to be written to their respective buffers. In other implementations, for this example, in response to the determination that the total number of write operations across all traffic managers exceeds the threshold level by 12 cells, traffic manager 106a decides to drop its prorated share of cells, i.e., 4 cells, from the number of cells that were to be written to the buffers 106a1 and 106a2. Similarly, each of the other traffic managers 106b and 106c independently decides to drop its respective prorated share of cells from the respective cells that were to be written to their respective buffers. In these implementations, the prorated share of each traffic manager is the same. In some implementations, the data are dropped, prior to be written to the buffers, in the current clock cycle. In some implementations, the data that are received in the next clock cycle are dropped.

In some cases, the number of cells that were to be written by a traffic manager to its buffers could be equal to or less than the threshold level. In such cases, the traffic manager drops all the cells that were to be written to its buffers.

In some implementations, a traffic manager, e.g., any of traffic managers 106a, 106b and 106c, drops X consecutive cells, irrespective of the traffic type of each cell. In other implementations, a traffic manager selects the X cells to drop, from the cells that are to be written to the buffers managed by the traffic manager, by considering the traffic types of the cells. For example, a traffic manager may receive cells of different types of traffic, e.g., unicast, CPU traffic, multicast, broadcast, or mirrored, traffic, or a combination of these. The traffic manager may determine to drop broadcast cells first. If the traffic manager cannot achieve the target of X dropped cells by selecting only broadcast cells, then the traffic manager may select multicast cells as well. If the X cells target is still not achieved, then the traffic manager may select cells for mirrored traffic, followed by CPU traffic, and, finally, unicast cells. A different order of selecting the traffic types is also possible.

In some implementations, the order in which cells are selected using the traffic type depends on the priority or importance of the traffic types. In the example provided above, unicast, CPU traffic, mirrored traffic, multicast traffic, and broadcast traffic have descending levels of priority, in that order. Accordingly, when selecting cells based on traffic type, the traffic manager first selects cells of the lowest priority traffic, e.g., broadcast traffic, followed by multicast, mirrored traffic, CPU traffic, and unicast, in that order. If the priorities of different types of traffic are different, then the order of selection also may be different. For example, in some implementations, multicast traffic has higher priority than mirrored traffic. In such implementations, the traffic manager selects, for dropping, mirrored traffic cells before selecting multicast cells. In this manner, in some implementations, to satisfy power constraints, a traffic manager selectively determines what types of traffic to be written, and what type of traffic cells to drop: first dropping cells of traffic types that have lower priority, and progressively selecting cells of higher priority traffic types if needed.

In some implementations, a traffic manager drops cells of a packet, of which some other cells were previously received and stored in a buffer, e.g., when the total amount of packet data to be written was less than the threshold. Upon dropping one or more cells of the packet, the packet is considered corrupted. In such implementations, upon dropping one or more cells of the packet, the traffic manager also removes, from the buffer, the other cells of the packet that it has stored in previous clock cycles.

In some implementations, a traffic manager checks the total amount of data to be written with multiple thresholds, to determine the types of cells to write to buffers, or to drop. As an example, in some implementations, traffic managers in the electronic device 100 compare the total number of cells to be written to three threshold levels—first, second and third thresholds. The first threshold has the lowest value, e.g., 12 cells, and the third threshold has the highest value, e.g., 24 cells, with the second threshold being in the middle, e.g., 18 cells, of the first and third thresholds in value. The traffic managers receive traffic of three different types—multicast traffic, CPU traffic and unicast traffic, with multicast traffic having the lowest priority, CPU traffic having higher priority than multicast traffic, and unicast traffic having the highest priority.

In the above example implementation, if a traffic manager, e.g., traffic manager 106a, determines that the total number of cells to be written is equal to or greater than the first (lowest) threshold but less than the second threshold, then the traffic manager selects the traffic type with the lowest priority, e.g., multicast traffic, to drop. Accordingly, prior to the buffer write operations, the traffic manager drops all multicast cells that were to be written to buffers managed by the traffic manager. If the traffic manager determines that the total number of cells to be written is equal to or greater than the second threshold but less than the third threshold, then the traffic manager selects, for dropping, the multicast traffic and further selects cells of the traffic type with the next higher priority, e.g., CPU traffic. Accordingly, prior to data being written to the buffers, the traffic manager drops all multicast cells and all CPU traffic cells that were to be written to buffers managed by the traffic manager. However, if the traffic manager determines that the total number of cells to be written is equal to or greater than the highest threshold, e.g., the third threshold, then the traffic manager selects, for dropping, cells of the traffic type with the highest priority, e.g., unicast cells, in addition to selecting lower priority traffic, e.g., multicast traffic and CPU traffic.

Different numbers of threshold levels, e.g., two, four or five thresholds, apart from the single threshold or triple threshold levels described above, can be used in different implementations. The number of threshold levels used by the electronic device 100 can correspond to the number of traffic types processed by the electronic device. As an example, in some implementations, the electronic device 100 is configured to process five different types of traffic: broadcast traffic, multicast traffic, mirrored traffic, CPU traffic and unicast traffic, with ascending values of priority. In such implementations, the electronic device 100 uses five threshold levels. If a traffic manager, e.g., traffic manager 106a, determines that the total number of cells to be written in the next cycle is equal to or greater than the lowest threshold but less than the next higher threshold, then the traffic manager selects the traffic type with the lowest priority, e.g., broadcast traffic, to drop. If the total number of cells in the next cycle is greater than the second lowest threshold, then the traffic manager selects for dropping both broadcast traffic and multicast traffic. If the total number of cells in the next cycle is greater than the third threshold, then the traffic manager selects for dropping broadcast, multicast and mirrored traffic. If the total number of cells in the next cycle is greater than the fourth or second highest threshold, then the traffic manager selects for dropping all traffic types except unicast traffic, e.g., broadcast, multicast, mirrored and CPU traffic. Finally, if the total number of cells in the next cycle is greater than the fifth or highest threshold, then the traffic manager selects for dropping all traffic types, including unicast traffic.

In some implementations, the types of traffic handled by a traffic manager, and correspondingly, the number of threshold levels used, correspond to the number of concurrent write operations supported by the traffic manager. Considering the example above with five threshold levels, in some implementations, the traffic manager 106a supports five concurrent write operations, each for a different type of traffic: broadcast, multicast, mirrored, CPU and unicast traffic. The traffic manager manages five buffers to support the five write operations: a buffer that is configured to store cells of broadcast packets; a buffer that is configured to store cells of multicast packets; a buffer that is configured to store cells of mirrored traffic packets; a buffer that is configured to store cells of CPU traffic packets; and a buffer that is configured to store cells of unicast packets. In such cases, when the traffic manager selects broadcast cells to drop, then prior to writing data to the broadcast buffer, the traffic manager does not store any cells in the broadcast buffer. Similar operations are performed for the other buffers when cells of other traffic types are selected. Different priority values are assigned to the different egress ports, or the buffers, or both, e.g., depending on the type of traffic serviced by the egress ports and the buffers. For example, an egress port and corresponding buffer that serve multicast traffic can have a lower priority than an egress port and corresponding buffer that serve unicast traffic.

In the above manner, one or more threshold levels can be enabled in different implementations, depending on the power consumption policies in the electronic device 100 and the types of traffic processed by the electronic device. Using the different threshold levels, the electronic device can dynamically determine what types of traffic to drop to manage power consumption of the electronic device.

In some implementations, one of more of the different threshold levels can be enabled or disabled depending on the traffic type. For example, a traffic manager, which is configured to use five threshold levels as described by the example above, determines that it will receive only CPU traffic and unicast traffic. In such cases, the traffic manager compares the total number of cells to be written to only the two highest threshold levels, which correspond to CPU traffic and unicast traffic. However, at a different time, the traffic manager determines that it will receive broadcast, multicast and unicast traffic. At this time, the traffic manager compares the total number of cells to the first and second threshold levels, e.g., the lowest two thresholds, which correspond to broadcast and multicast traffic, and the fifth threshold level, e.g., the highest threshold, which corresponds to unicast traffic. In this manner, an electronic device 100 that supports multiple threshold levels can dynamically determine which threshold levels to use.

In some implementations of the electronic device 100, the one or more threshold levels can be set by a user, e.g., by an operator who configures the electronic device and sets the threshold levels in accordance with targeted limits of power consumption by the electronic device. In such implementations, the user can change the threshold levels, depending on changes in the targeted limits. In some implementations, the one or more threshold levels are set to constant values, e.g., at the time of device manufacture, and cannot be changed by the user.

In some implementations, when the crossbar 104 broadcasts the cells with state information from the ingress packet processors to the traffic managers, different traffic managers can receive the information at different times due to varying propagation delays in the electronic device 100. This can be the case, for example, when the physical distances from different ingress packet processors to different traffic managers are different. For example, the physical distance between the ingress packet processor 102a and the traffic manager 106a can be less in the circuit of the electronic device 100, compared to the physical distance between the ingress packet processor 102a and the traffic manager 106c. In contrast, the physical distance between the ingress packet processor 102c and the traffic manager 106c can be less compared to the physical distance between the ingress packet processor 102c and the traffic manager 106a.

In such implementations, one or more traffic managers perform operations to ensure that all traffic managers access the information from the crossbar 104 at the same time, so that the computation of the total amount of data to be written at the same time is consistent across all traffic managers. Upon receiving the data from the crossbar 104, one or more traffic managers delay reading of the information by time intervals that account for the variance in transmission from the ingress packet processors to the traffic managers. For example, in some cases, the crossbar 104 broadcasts, to traffic managers 106a, 106b and 106c, cells with state information from the ingress packet processor 102a. The traffic manager 106a receives the information from the crossbar 104 earlier than other traffic managers, while traffic manager 106b receives the information before the traffic manager 106a. Logic in the traffic manager 106a, e.g., filtering logic, computes the transmission times from the ingress packet processor 102a to the traffic managers 106b and 106c by analyzing the physical delays in the circuit, and determines that the maximum transmission time from the ingress packet processor 102a is to the traffic manager 106c. Following this determination, traffic manager 106a computes the additional delay as the difference between the time that it receives the information from the crossbar 104 and the time at which traffic manager 106c receives the same information from the crossbar 104. After receiving the information from the crossbar 104, the traffic manager 106a waits for this additional delay period before it reads the received information.

Similarly, the traffic manager 106b independently determines that the maximum transmission time from the ingress packet processor 102a is to the traffic manager 106c. Accordingly, traffic manager 106b computes its additional delay as the difference between the time that it receives the information from the crossbar 104, and the time at which the traffic manager 106c receives the same information from the crossbar 104. Traffic manager 106b waits for this additional delay period before it reads the information received from the crossbar 104.

The traffic manager 106c also independently determines that the maximum transmission time from the ingress packet processor 102a is to itself. Following this determination, upon receiving the information from the crossbar 104, traffic manager 106c proceeds to read the information without waiting for any additional time period, since other traffic managers have already received the information from the crossbar and are expected to read the information at this time.

In the above manner, each traffic manager independently determines whether to delay reading of the state information received from the crossbar 104, such that all traffic managers read the information at the same time and thereby compute the total amount of data in synchronization. As described above, different traffic managers may delay reading the information by different time periods. In the example above, traffic manager 106a delays reading the information by a longer time period compared to the traffic manager 106b, since traffic manager 106a receives the information from the crossbar 104 earlier compared to traffic manager 106b.

In some implementations, in addition, or as an alternative, to reducing power consumption by controlling storage of cells in buffers, power consumption is reduced by controlling the switching operations performed by the electronic device 100. Switching is controlled by limiting the rate of packet processing by the ingress packet processors. In some implementations, the rate of packet processing by an ingress packet processor is limited by limiting the packet rate going into the ingress packet processor, e.g., by traffic shaping using a token bucket mechanism, as described below.

Figure 2:
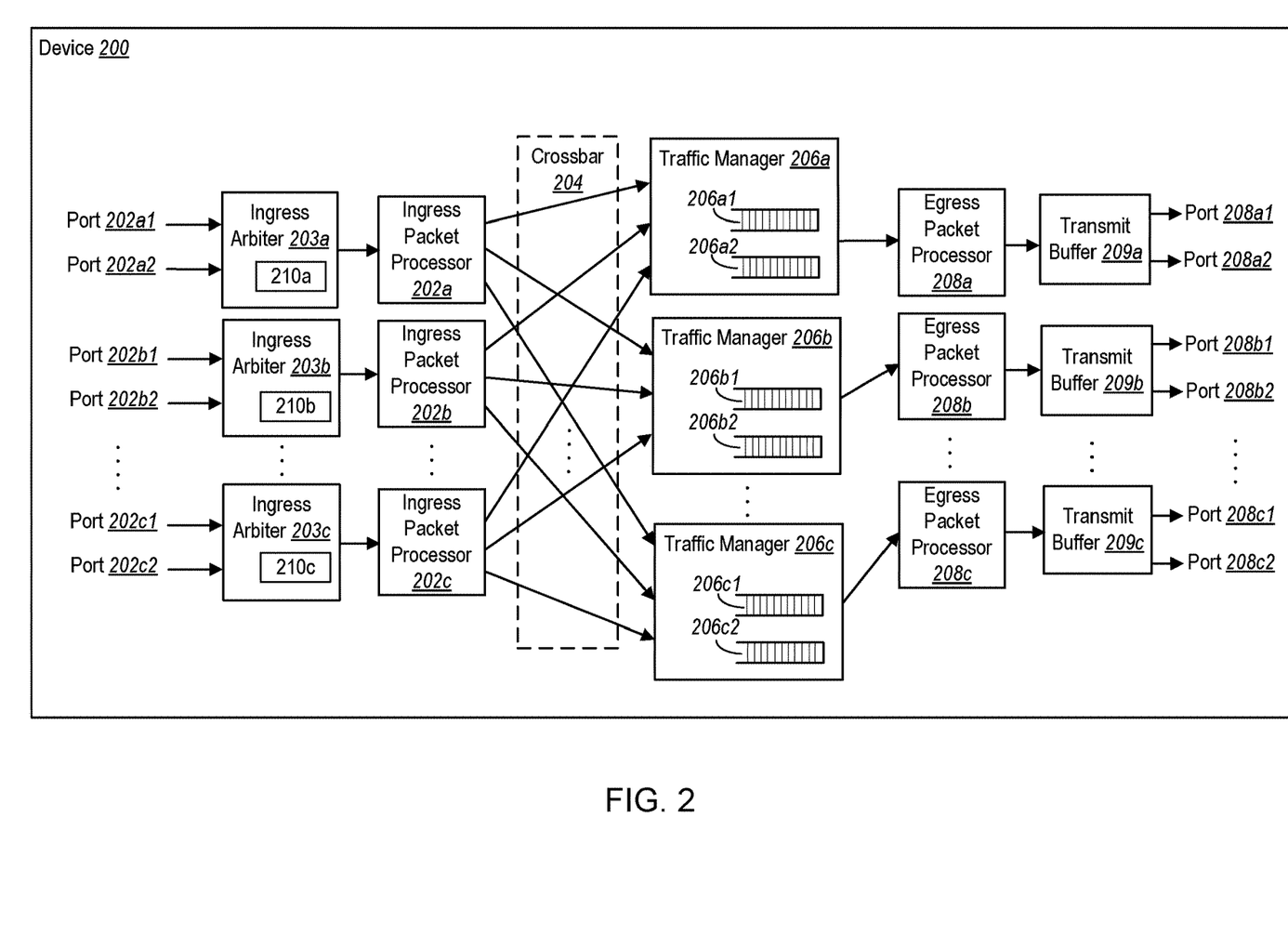
FIG. 2 illustrates an example electronic device that includes traffic managers along with one or more ingress arbiters that each includes a traffic shaper.

FIG. 2 illustrates an example electronic device 200 that includes traffic managers 202a, 202b and 202c, along with ingress arbiters, e.g., ingress arbiters 203a, 203b and 203c that each includes a traffic shaper, e.g., ingress arbiters 203a, 203b and 203c include traffic shapers 210a, 210b and 210c respectively. The electronic device 200 also includes ingress ports that are connected to the ingress arbiters, e.g., ingress ports 202a1 and 202a2 connected to ingress arbiter 203a; ingress ports 202b1 and 202b2 connected to ingress arbiter 203b; and ingress ports 202c1 and 202c2 connected to ingress arbiter 203c. Each traffic shaper regulates packet rate across all the ingress ports associated with the corresponding ingress arbiter. A crossbar 204 in the electronic device 200 connects the ingress packet processors to the traffic managers. The electronic device 100 also includes egress packet processors 208a, 208b and 208c, and corresponding transmit buffers 209a, 209b and 209c, respectively, which connect the egress packet processors to groups of egress ports. For example, egress packet processor 208a is connected through transmit buffer 209a to egress ports 208a1 and 208a2; egress packet processor 208b is connected through transmit buffer 209b to egress ports 208b1 and 208b2; and egress packet processor 208c is connected through transmit buffer 209c to egress ports 208c1 and 208c2.

Each traffic manager includes one or more buffers to buffer packet data, e.g. traffic manager 206a includes buffers 206a1 and 206a2; traffic manager 206b includes buffers 206b1 and 206b2; and traffic manager 206c includes buffers 206c1 and 206c2. Traffic manager 206a forwards cells stored in the buffers 206a1 or 206a2, or both, to a packet queue corresponding to the egress packet processor 208a, for transmitting through one or more egress ports in the group of ports coupled to the egress packet processor 208a, e.g., egress ports 208a1 or 208a2, or both. Similarly, traffic manager 206b forwards cells stored in the buffers 206b1 or 206b2, or both, to a packet queue for egress packet processor 208b, for transmitting through one or more egress ports, e.g., egress ports 208b1 or 208b2, or both, in the group of ports coupled to the egress packet processor 208b; and traffic manager 206c forwards cells stored in the buffers 206c1 or 206c2, or both, to a packet queue for egress packet processor 208c, for transmitting through one or more egress ports, e.g., egress ports 208c1 or 208c2, or both, in the group of ports coupled to the egress packet processor 208c.

The ingress ports in the electronic device 200, e.g., ingress ports 202a1, 202a2, 202b1, 202b2, 202c1 and 202c2, receive packets from various external data sources and forward the packets to the respective ingress arbiters to which the ingress ports are connected. The ingress arbiters 203a, 203b and 203c include traffic shapers, e.g., traffic shapers 210a, 210b and 210c respectively, to shape or manage the packet data traffic that is sent to the ingress packet processors by limiting the packet rate fed to the ingress packet processors, e.g., 202a, 202b and 202c respectively, coupled to the ingress arbiters, as described in greater detail below. The crossbar 204 receives packet data from the ingress packet processors, e.g., in units of cells, and broadcasts the packet data to all the traffic managers in parallel. State information is included with each cell, which provides information on the target egress port through which the corresponding packet is to be transmitted. Each traffic manager determines, by reading the state information provided along with each cell, which cells are to be written to buffers managed by the traffic manager.

In some implementations, the electronic device 200 is similar to the electronic device 100 and performs functions that include functions performed by the electronic device 100, as described above. In such implementations, the crossbar 204 performs functions that include functions performed by the crossbar 104, and the traffic managers 206a, 206b and 206c perform functions that include functions similar to those performed by the traffic managers 106a, 106b and 106c described above.

In some implementations, there is one ingress arbiter for each group of ingress ports, connecting the ingress port group to the corresponding ingress packet processor. For example, ingress arbiter 203a connects the group of ingress ports that include ingress ports 202a1 and 202a2 to the corresponding ingress packet processor 202a; ingress arbiter 203b connects the group of ingress ports that include ingress ports 202b1 and 202b2 to the corresponding ingress packet processor 202b; and ingress arbiter 203a connects the group of ingress ports that include ingress ports 202c1 and 202c2 to the corresponding ingress packet processor 202c. However, in other implementations, there are multiple ingress arbiters connecting a group of ingress ports to the corresponding ingress packet processor, or an ingress arbiter connects multiple groups of ingress ports to the respective ingress packet processors.

As noted above, the traffic shapers 210a, 210b and 210c are employed in the electronic device 200 to limit the rate at which packet data is fed to the respective ingress packet processors connected to each ingress arbiter. For example, traffic shaper 210a is used to limit the rate at which packet data, received from one or more ingress ports 202a1 and 202a2, is fed to the ingress packet processor 202a that is connected to the output of the ingress arbiter 203a. Similarly, traffic shaper 210b is used to limit the rate at which packet data, received from one or more ingress ports 202b1 and 202b2, is fed to the ingress packet processor 202b that is connected to the output of the ingress arbiter 203b; and traffic shaper 210c is used to limit the rate at which packet data, received from one or more ingress ports 202c1 and 202c2, is fed to the ingress packet processor 202c that is connected to the output of the ingress arbiter 203c. By limiting the rate at which packet data is fed to the ingress packet processors, the amount of processing performed by the ingress packet processors is limited. Additionally, the number of cells that are sent to the traffic managers per clock cycle is also lowered, which in turn reduces the probability of cells being dropped by the traffic managers. These have the effect of reducing the power consumption by the electronic device. Additionally, by reducing the probability of cells being dropped by the traffic managers, fewer packets are lost by the electronic device 200 as a result of the cell dropping actions described above, leading to improvements in reliability of the electronic device 200 and improvements in data transmission.

In some implementations, each of the traffic shapers 210a, 210b and 210c is used to limit the rate of data flow to the corresponding ingress packet processor by using a token bucket mechanism. In such implementations, each traffic shaper starts out with a logical bucket full of "tokens." If packets are received from one or more of the ingress ports connected to the corresponding ingress arbiter, the ingress arbiter consumes a token from the bucket of tokens available to its traffic shaper, when the ingress arbiter forwards a packet, or schedules a packet to be forwarded, to the connected ingress packet processor in one clock cycle. A packet is forwarded to the ingress packet processor only if there are tokens available in the bucket. If there are no tokens available in the bucket, then, in some implementations, the ingress arbiter drops the packets received from the ingress ports, until the bucket is replenished with new tokens. In other implementations, the ingress arbiter temporarily stores the additional packets in input buffers managed by the ingress arbiter, until tokens become available to forward the packets to the ingress packet processor; or the buffer storage time reaches a threshold value, at which time the additional packets are dropped.

In some implementations, the total number of tokens placed in a bucket corresponds to the target rate at which packet processing is done by the respective ingress packet processor. For example, ingress packet processor 202a can be configured to process packets at 250 Megahertz (MHz). In such implementations, the traffic shaper 210a generates up to 250 million tokens per second in its bucket. In each of the 250 million clock cycles in one second, the traffic shaper 210a allows the ingress arbiter 203a to consume one token, thereby allowing one packet from one of the corresponding ingress ports, e.g., one of ingress ports 202a1 and 202a2, to be sent to the ingress packet processor 202a. If the ingress arbiter 203a receives packets from the ingress ports at a higher rate, e.g., at 0.5 Gigahertz (GHz) rate, which corresponds to twice the number of packets per clock cycle compared to 250 MHz, then the ingress arbiter 203a will drop or buffer any additional packets received per clock cycle, instead of sending the additional packets to the ingress packet processor 202a.

A traffic shaper replenishes its bucket, e.g., refills the bucket with new tokens, periodically. In some implementations, a traffic shaper, e.g., traffic shaper 210a, refills its bucket after the expiry of a refresh time interval. The traffic shaper uses a timer that counts down to the refresh interval. The refresh interval can be set in terms of clock cycles, e.g., 1500 clock cycles. When the timer expires, e.g., after every 1500 clock cycles in the above example, the traffic shaper replenishes the expended tokens in its bucket.

In some implementations, the refresh time interval is a programmable value. In such implementations, a user of the electronic device 200 specifies a target packet processing rate for the device using a user-configurable device setting. Based on the user-specified target processing rate, logic circuitry in the electronic device 200 sets the refresh time interval such that the traffic shapers in the electronic device 200 can supply packets to the respective ingress packet processors to achieve the target packet processing rate. Tokens are added to the bucket according to a rate of N tokens every T clock cycles (where N and T are positive integers). One or more tokens are removed from the bucket on every transmission, depending on what is being shaped (e.g., packets, bytes, or cells). If nothing is transmitted (e.g., the device is idle), then the bucket will keep receiving tokens (and potentially overflow). To contain the amount of tokens that can be accumulated, a maximum burst size is used.

In some implementations, a traffic shaper is dynamically tuned based on one or more parameters. These parameters include, for example, monitored power usage of the electronic device 200, the number of cell drops observed in the electronic device 200 to regulate power consumption by the electronic device 200, total buffer (or buffer partition) usage of the electronic device 200, length of a queue (e.g., in bytes or cells) corresponding to an egress port, maximum delay (e.g., instantaneous or average delay) across a queue or across a subset of queues, or a suitable combination of these parameters. As an example, if the switching activity of the electronic device increases due to receiving data at high rates, thereby leading to increased power consumption, then the number of tokens that are generated by a traffic shaper for admitting cells is dynamically adjusted to limit the increase in power consumption by the device. In some implementations, the token generation rate by a traffic shaper, e.g. traffic shaper 210a, is reduced. This results in limiting the number of cells that are admitted for switching by the corresponding ingress arbiter, e.g., ingress arbiter 203a, leading to a reduction in power consumption. Dynamically managing the token generation by a traffic shaper can be achieved by adjusting the refresh time interval for the traffic shaper to refill its bucket. The refresh time interval can be increased so that the traffic shaper refills its bucket of tokens at a slower rate, and thus decreasing the rate at which its tokens are available for admitting cells.

The token generation rate for a traffic shaper is correlated to the number of cells that are dropped by the corresponding ingress arbiter, e.g., when the arbiter's buffer is quickly filled up due to a lower rate at which the traffic shaper supplies tokens. By monitoring the number of cell drops by the ingress arbiter, the token generation rate of the traffic shaper can be fine tuned to limit the number of cell drops to be less than target limits for drops, while also limiting the power consumption by the electronic device to be within target power levels. The number of cell drops that are observed may be presented as an instantaneous number, an average number, or a sum over a window of time.

Conversely, if the traffic shaping in the electronic device 200 is effectively managed to an extent such that the power consumption by the device is well under preset power target levels, then the electronic device may be capable of increasing its switching activity without exceeding its power consumption targets. In some implementations, then the number of tokens that are generated by a traffic shaper, e.g., traffic shaper 210a, is dynamically increased to increase the rate at which cells are admitted by the corresponding ingress arbiter, e.g., ingress arbiter 203a, which leads to an increase in switching activity and thereby increases power consumption. The traffic generation rate of a traffic shaper is managed to ensure that the rate of admittance of cells is managed such that the total power consumption by the electronic device stays within target levels.

As noted above, in some implementations, each ingress arbiter further includes, in addition to traffic shapers, input buffers. The input buffers are used to temporarily store incoming packets until tokens are available to forward the packets to the corresponding ingress packet processor, e.g., in cases where the incoming packet rate is greater than the processing rate of the ingress packet processor. In some implementations, each input buffer includes components that can be implemented using combinational logic circuitry, e.g., logic gates, flip-flops and registers. An input buffer also includes memory components that can be implemented using memory chips or fabricated on one integrated circuit with the rest of the transmit buffer.

In the above manner, the electronic device 200 uses ingress arbiters with traffic shapers, e.g., ingress arbiters 203a, 203b and 203c with traffic shapers 210a, 210b and 210c respectively, to manage the packet processing rate by the ingress packet processors in the device, thereby manage the power consumption by the electronic device. The traffic shapers are used in conjunction with, or as an alternative to, the threshold comparison techniques employed by the traffic managers, e.g., traffic managers 206a, 206b and 206c, whose are similar to those described above with respect to traffic managers 106a, 106b and 106c in the electronic device 100.

Figure 3:
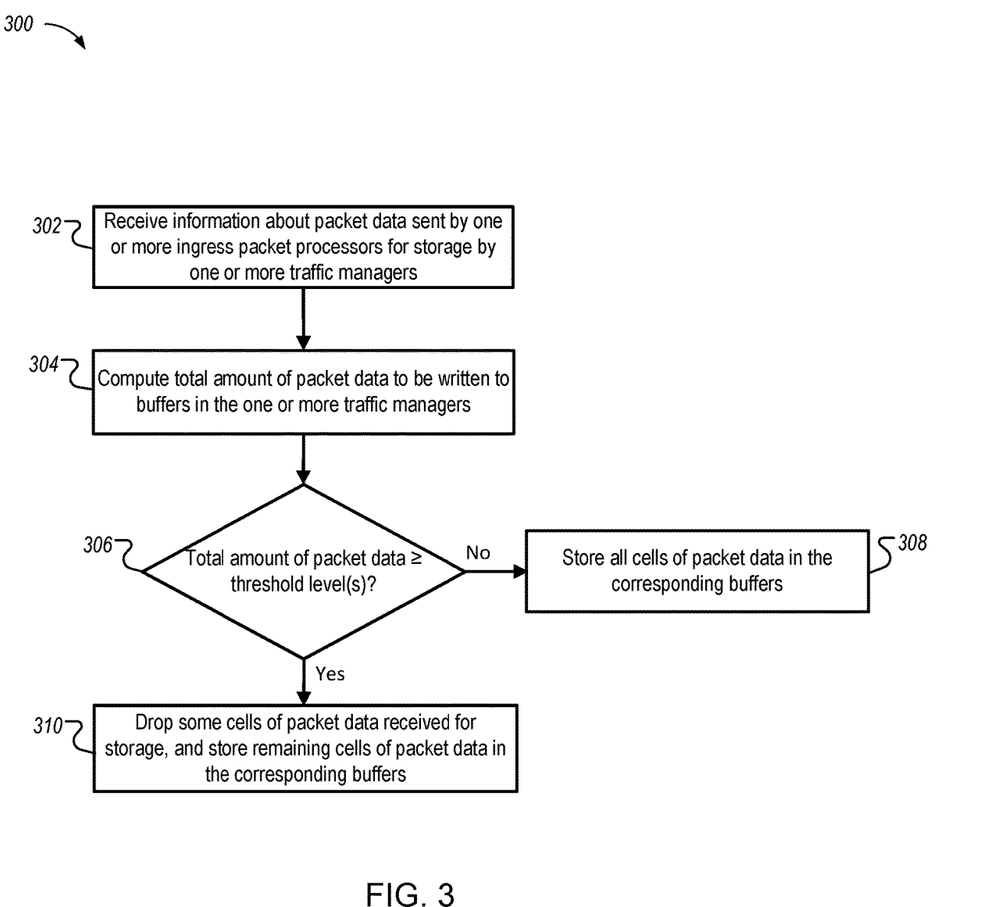
FIG. 3 illustrates an example process employed by a traffic manager in an electronic device to store packet data in buffers.

FIG. 3 illustrates an example process 300 employed by a traffic manager in an electronic device to store packet data in buffers. In some implementations, the process 300 is performed by the electronic device 100, e.g., executed by each traffic manager 106a, 106b and 106c, and similarly, by each of the traffic managers 206a, 206b and 206c, when storing packet data cells in their respective buffers. Accordingly, the following sections describe the process 300 as being performed by the traffic managers 106a, 106b and 106c in the electronic device 100. However, in other implementations, the process 300 may be performed by other systems or devices.

The process 300 starts when a traffic manager receives information about packet data sent by one or more ingress packet processors for storage by one or more traffic managers (302). For example, each of the traffic managers 106a, 106b and 106c receive, from the crossbar 104, a broadcast of cells corresponding to packet data sent by one or more of the ingress packet processors 102a, 102b and 102c, along with state information about the cells.

Each traffic manager computes the total amount of packet data to be written to buffers in the one or more traffic managers that are part of the same device (304). For example, each of the traffic managers 106a, 106b and 106c, independently computes, using the state information received in the broadcast from the crossbar 104, the total number of cells that are to be written in all the buffers managed by the traffic managers, e.g., buffers 106a1, 106a2, 106b1, 106b2, 106c1 and 106c2.

Each traffic manager checks whether the total amount of packet data is equal to or greater than one or more predetermined threshold levels (306). For example, each of the traffic managers 106a, 106b and 106c independently compares the total number of cells, to one or more threshold levels. In some implementations, each traffic manager compares the total number of cells to be written to a single threshold level. This is the case, for example, when traffic of a single type, e.g., unicast packets, is received. In some implementations, each traffic manager compares the total number of cells to be written to multiple threshold levels. This is the case, for example, when traffic of different types, e.g., unicast, multicast, CPU traffic and mirrored traffic, are received. In such implementations, different types of traffic can have different priorities, with traffic having lower priority, e.g., multicast traffic, being dropped before traffic having higher priority, e.g., unicast traffic. In such cases, a threshold level with a lower value can correspond to a traffic type having a lower priority, while a threshold level with a higher value can correspond to a traffic type having a higher priority. A traffic manager compares the total amount of data to a threshold level with lower value before comparing the total amount of data to a threshold level with higher value.

If a traffic manager determines that the total amount of packet data is less than the one or more threshold levels, then the traffic manager stores all cells of packet data in the corresponding buffers (308). For example, upon determining that the total number of cells computed is less than the one or more threshold levels, the traffic manager 106a identifies which of these cells are destined for egress ports coupled to the traffic manager, e.g., one or more of egress ports 108a1 and 108a2. The traffic manager 106a stores the identified cells in the buffers corresponding to the egress ports. For example, the traffic manager 106a stores cells of packets destined for egress port 108a1 in buffer 106a1, and stores cells of packets destined for egress port 108a2 in buffer 106a2. The traffic manager 106a drops any remaining cells that are destined for egress ports managed by the other traffic managers, e.g., any of egress ports 108b1, 108b2, 108c1 and 108c2. Similarly, the traffic manager 106b identifies cells of packets destined for egress ports 108b1 or 108b2, or both, and stores these cells in respective buffers 106b1 or 106b2, while discarding cells of packets destined for egress ports managed by other traffic managers; and the traffic manager 106c identifies cells of packets destined for egress ports 108c1 or 108c2, or both, and stores these cells in respective buffers 106c1 or 106c2, while discarding cells of packets destined for egress ports managed by other traffic managers.

As noted previously, in some implementations, cells that arrive in a given clock cycle and are stored in buffers, are portions of different packets. Even if a cell from a given packet is stored in a buffer in a clock cycle, not all cells for that packet may be stored. For example, another cell for that packet that arrives in a future clock cycle may be dropped, such that a traffic manager will subsequently drop all prior cells associated with the packet that have been stored in the corresponding buffer, and all remaining cells of the packet that arrive in future clock cycles.

On the other hand, if a traffic manager determines that the total amount of packet data is equal to or greater than the one or more threshold levels, then the traffic manager drops some cells of packet data received for storage, and stores remaining cells of packet data in the corresponding buffers (310). For example, upon determining that the total number of cells computed at 306 is equal to or greater than the one or more threshold levels, the traffic manager 106a identifies which of these cells are destined for egress ports coupled to the traffic manager, e.g., one or more of egress ports 108a1 and 108a2. The traffic manager drops some of the identified cells, while storing the remaining cells destined for the egress ports coupled to the traffic manager, in the respective buffers corresponding to the egress ports. The traffic manager also discards the cells that are destined for egress ports managed by other traffic managers. Similarly, each of traffic managers 106b and 106c identifies which of the total number cells are destined for egress ports coupled to the respective traffic manager, and drops some of the identified cells, while storing the remaining cells destined for the respective managed egress ports, in the respective buffers corresponding to the egress ports, and also discards the cells that are destined for egress ports managed by other traffic managers.

In some implementations, each traffic manager first drops cells of lower priority traffic types, e.g., multicast traffic, e.g., when the total number of cells equals or exceeds a lower threshold level, but is less than a higher threshold level. If the total number of cells equals or exceeds one or more higher threshold levels, then the traffic manager progressively drops cells of higher priority traffic types, e.g., CPU traffic, followed by unicast traffic.

In some implementations, the number of cells that are dropped is equal to the difference between the total number of cells in the current clock cycle, or a future clock cycle, and the threshold value that is equaled or exceeded. In some implementations, all cells of a particular traffic type are dropped, irrespective of the difference between the total number of cells in the current clock cycle or the future clock cycle and the threshold value that is equaled or exceeded. The determination of which cells are to be dropped are made in the same clock cycle that the cells are to be written, or a clock cycle that occurs prior to the clock cycle when the cells are to be written.

In some implementations, if a traffic manager determines that the total amount of packet data is equal to or greater than the one or more threshold levels, then the traffic manager drops all cells for all packets arriving at that time. In such cases, the traffic manager also drops previously stored cells for these packets, as well as additional cells for these packets that are received in subsequent clock cycles.

Figure 4:
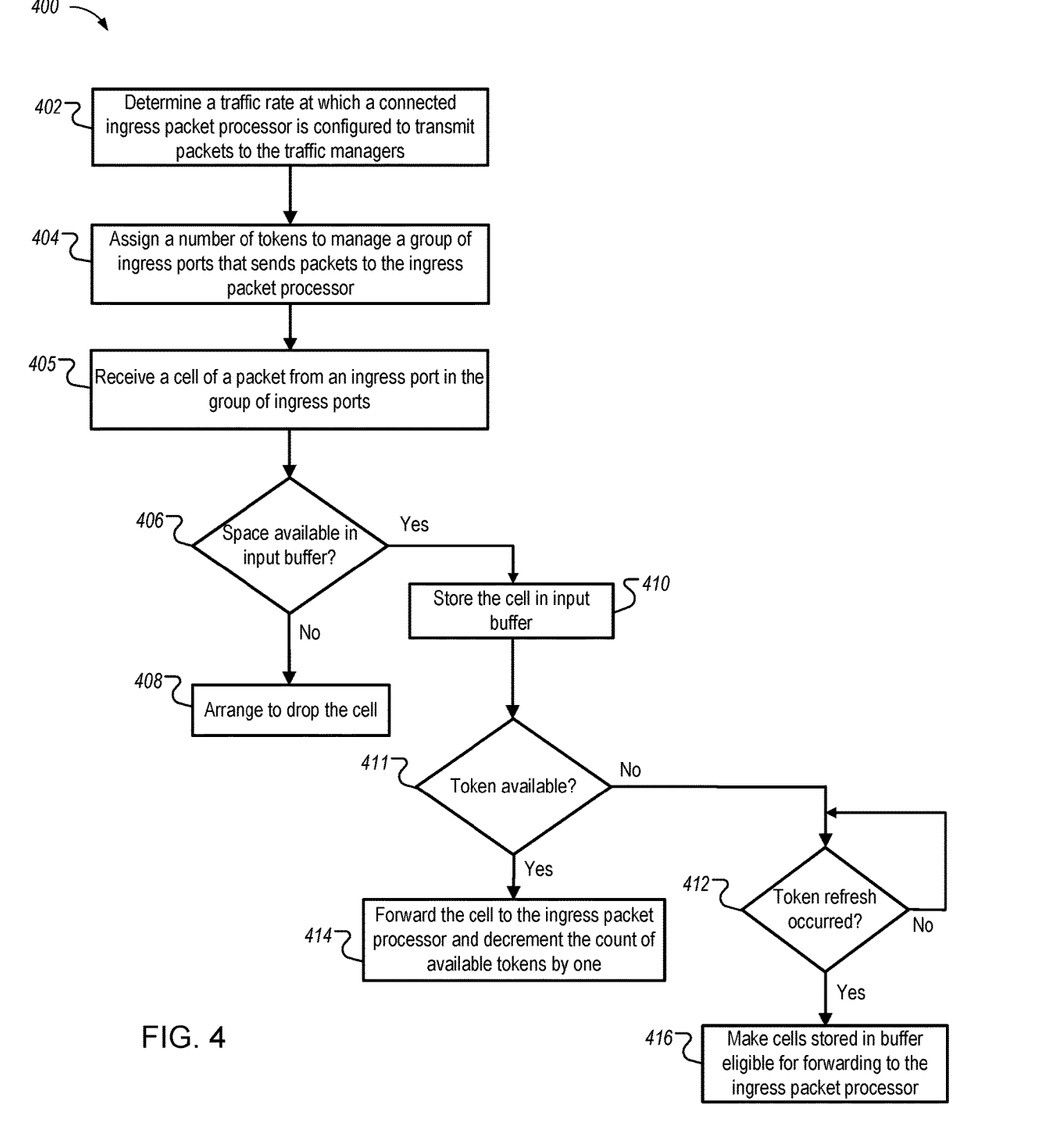
FIG. 4 illustrates an example process used by an ingress arbiter to manage the rate of traffic fed to an ingress packet processor.

FIG. 4 illustrates an example process 400 used by an ingress arbiter to manage the rate of traffic fed to an ingress packet processor. In some implementations, the process 400 is independently performed by each of the ingress arbiters 203a, 203b and 203c, when forwarding packets received from ingress ports to the corresponding ingress packet processors, e.g., ingress packet processors 202a, 202b and 202c, respectively, that are connected to the ingress arbiters. In some implementations, the ingress arbiters 203a, 203b and 203c perform the process 400 using information from their respective traffic shapers 210a, 210b and 210c. Accordingly, the following sections describe the process 400 with respect to the ingress arbiters 203a, 203b and 203c and their corresponding traffic shapers 210a, 210b and 210c, respectively. However, in other implementations, the process 400 may be performed by other systems or devices.

In some implementations, the process 400 is performed in conjunction with the process 300, which is independently performed by each of the traffic managers 206a, 206b and 206c, as described above.

The process 400 starts when an ingress arbiter determines a traffic rate at which a connected ingress packet processor is configured to transmit cell of packets to the traffic managers (402). For example, the ingress arbiter 203a determines the packet processing rate used by the ingress packet processor 202a that is connected to the ingress arbiter 203a. Similarly, the ingress arbiter 203b determines the packet processing rate used by the ingress packet processor 202b that is connected to the ingress arbiter 203b; and the ingress arbiter 203c determines the packet processing rate used by the ingress packet processor 202c that is connected to the ingress arbiter 203c. In some implementations, the packet processing rate used by the different ingress packet processors is the same. In other implementations, different packet processing rates are used by different ingress packet processors. As disclosed above, in some implementations, the packet processing rate used by an ingress packet processor is configured in the device using a configuration value specified by a user of the electronic device 200.

An ingress arbiter assigns a number of tokens to manage a group of ingress ports that sends packets to the ingress packet processor through the ingress arbiter (404). For example, upon determining the packet processing rate for the ingress packet processor 202a, the ingress arbiter 203a computes a number of tokens that would enable packet processing by the ingress packet processor 202a at the desired rate. The ingress arbiter 203a assigns the computed number of tokens to the traffic shaper 210a, to manage the input data rate for the group of ingress ports including ingress ports 202a1 and 202a2 that are connected to the ingress arbiter 203a. Similarly, the ingress arbiter 203b computes a number of tokens corresponding to the target packet processing rate by the ingress packet processor 202b, assigns the computed number of tokens to the traffic shaper 210b, to manage the input data rate for the group of ingress ports including ingress ports 202b1 and 202b2 that are connected to the ingress arbiter 203b; and the ingress arbiter 203c computes a number of tokens corresponding to the target packet processing rate by the ingress packet processor 202c, and assigns the computed number of tokens to the traffic shaper 210c, to manage the input data rate for the group of ingress ports including ingress ports 202c1 and 202c2 that are connected to the ingress arbiter 203c.

In some implementations, the tokens are implemented using an up-down counter. In some implementations, the number of tokens assigned to each traffic shaper is the same across all traffic shapers. This is the case, for example, when the packet processing rate for all the ingress packet processors is the same. However, in other implementations, different traffic shapers are assigned different numbers of tokens to the corresponding ingress port groups, e.g., when the ingress packet processors have different packet processing rates.

An ingress arbiter receives a cell of packet from an ingress port in the group of ingress ports (405). For example, the ingress arbiter 203a receives cells corresponding to packets from one or more of the ingress ports that are connected to the ingress arbiter 203a, e.g., ingress ports 202a1 or 202a2, or both. Similarly, the ingress arbiter 203b receives cells corresponding to packets from one or more of the ingress ports that are connected to the ingress arbiter 203b, e.g., ingress ports 202b1 or 202b2, or both; and the ingress arbiter 203c receives cells corresponding to packets from one or more of the ingress ports that are connected to the ingress arbiter 203c, e.g., ingress ports 202c1 or 202c2, or both.

Upon receiving a cell of a packet, an ingress arbiter checks if space is available in an input buffer associated with the ingress arbiter (406). For example, ingress arbiter 203a checks to see if there is space in an input buffer to store cells that are received.

If space is available in the input buffer, then the ingress arbiter temporarily stores the packet in an input buffer (410). For example, upon receiving a cell of packet for sending to the ingress packet processor 202a, the ingress arbiter 203a stores the cell in an input buffer that is maintained in the ingress arbiter if there is space available in the input buffer to store the cell. Similarly, if the ingress arbiters 203b and 203c store their respective cells in input buffers if there is space available in the input buffers.

Drops occur when there is no space available in the input buffer to store the cells before they are eligible to be forwarded. If an ingress arbiter determines that space is not available in the corresponding input buffer, then the ingress arbiter arranges to drop the cell that is received (408). For example, upon receiving a cell, ingress arbiter 203a checks whether there is space available in a corresponding input buffer to store the newly received cell, until a token becomes available. If there is no space available in the buffer, e.g., the buffer is full with waiting cells, then the ingress arbiter 203a arranges to drop the cell. In some implementations, the ingress arbiter 203a marks the cell as an EOP cell with a drop notation and forwards the cell to the ingress packet processor 202a. In some implementations, for the ingress buffer, an empty cell (e.g., with no data) with an EOP indicator is linked to the queue, since there is no buffer to store the cell. On de-queue, the empty cell is converted to a single byte cell with error and EOP indication. When an EOP cell with a drop notation is received by the traffic manager, e.g., traffic manager 206a, the traffic manager drops the cell, along with all other cells of the packet that are stored in the traffic manager buffers for store- and forward packets. If the packet is being transmitted as a cut-through packet, then the EOP cell is forward along with an error flag. The error flag forces the packet to depart the device with a bad checksum (e.g., cyclic redundancy check or CRC), such that the downstream device that receives the packet knows the packet has been corrupted and therefore drops the packet. Further, any additional cells of the packet that are received in subsequent time intervals (e.g., clock cycles) are also dropped. Such a circumstance arises when the rate at which cells are received from the ingress ports, e.g. ingress port 202*a*1 or 202*a*2, is significantly greater than the rate at which cells are processed by the ingress packet processors, e.g., ingress packet processor 202*a*, such that input buffer in the ingress arbiter gets filled with waiting cells. In a similar manner, ingress arbiters 203*b* and 203*c* store arriving cells in the respective input buffers, or arrange to drop the cells if the respective input buffers are full.

After storing a cell in an input buffer, an ingress arbiter checks with its traffic shaper whether a token is available (411). For example, to forward cells received from connected ingress ports that are stored in respective buffers, each of the ingress arbiters 203*a*, 203*b* and 203*c* query the respective traffic shapers 210*a*, 210*b* and 210*c* to check if there are tokens available in the respective bucket of tokens assigned to the respective group of connected ingress ports.

If a token is available, then an ingress arbiter forwards the cell to the ingress packet processor and decrements the count of available tokens by one (414). For example, if the ingress arbiter 203*a* determines, using information from the traffic shaper 210*a*, that a token is available in the bucket of tokens assigned to the ingress port group including ingress ports 202*a*1 and 202*a*2, then the ingress arbiter 203*a* forwards a cell of a packet, which is stored in a buffer of the ingress arbiter, to the ingress packet processor 202*a*, and consumes a token from its bucket. Similarly, if the ingress arbiter 203*b* determines, using information from the traffic shaper 210*b*, that a token is available in the bucket of tokens assigned to the ingress port group including ingress ports 202*b*1 and 202*b*2, then the ingress arbiter 203*b* forwards a cell of a packet to the ingress packet processor 202*b*, consuming a token from its bucket; and if the ingress arbiter 203*c* determines, using information from the traffic shaper 210*c*, that a token is available in the bucket of tokens assigned to the ingress port group including ingress ports 202*c*1 and 202*c*2, then the ingress arbiter 203*c* forwards a cell of a packet to the ingress packet processor 202*c*, consuming a token from its bucket.

In some implementations a cell becomes eligible for forwarding to the ingress packet processor if a token is available. In such cases, the cell may not be immediately forwarded by an ingress arbiter to the packet processor for other reasons, e.g., for flow control. In some implementations, a traffic shaper consumes a token from its bucket only upon forwarding an initial cell of a packet, which is also referred to as a start of packet (SOP) cell. In such cases, for other cells of packet, e.g., middle of packet (MOP) cells or end of packet (EOP) cells, no tokens are consumed. This ensures that one token is consumed per packet, and not more.

On the other hand, if a token is not available, then the cells remain stored in a buffer of an ingress arbiter until a token becomes available. In such cases, an ingress arbiter periodically checks whether a token refresh has occurred (412). For example, a traffic shaper includes a token bucket counter that receives new tokens according to a known period (e.g., periodically). The number of tokens to be added to the bucket is configured such that the tokens per period equal the target processing rate. If there are no tokens available, then any cell buffered due to lack of tokens waits until the token bucket is refreshed. The amount of tokens that can be accumulated may be limited by a maximum burst size.

Each traffic shaper periodically checks whether the associated token refresh has occurred. In some implementations, the token refresh is a background process. A timer is maintained determine the time since the last refresh. If the time since last refresh exceeds a configured refresh interval, then a token refresh is performed. If a token refresh occurs, then the ingress arbiter makes the cells stored in the buffer eligible for forwarding to the corresponding ingress packet processor (416). For example, when ingress arbiter 203*a* determines that tokens are again available, the ingress arbiter 203*a* resumes forwarding the cells that are stored in the corresponding input buffer, to the ingress packet processor 202*a*.

In some implementations, if a token is not available (411), then an ingress arbiter immediately arranges to drop the cell, instead of leaving the cell stored in an input buffer until a token refresh occurs. In such cases, the ingress arbiter changes the cell to an EOP cell and forwards to its ingress packet processor with a drop notation, such that the cell is dropped, along with other stored cells belonging to the same packet, when it reaches the traffic manager. In such implementations, the operation of checking for token refresh is optional.

The processes and logic flows described in this document can be performed by one or more programmable processors executing one or more computer programs to perform the functions described herein. The processes and logic flows can also be performed by, and apparatus can also be implemented as, special purpose logic circuitry, e.g., a field programmable gate array (FPGA) or an ASIC.

Processors suitable for the execution of a computer program include, by way of example, both general and special purpose microprocessors, and any one or more processors of any kind of digital computer. Generally, a processor will receive instructions and data from a read only memory or a random access memory or both.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A network device, comprising:
   a traffic manager that manages one or more buffers storing packet data for forwarding to packet queues corresponding to egress packet processors of the network device, wherein the traffic manager is configured to perform operations comprising:
- receiving, from a crossbar associated with the network device, information about packet data received at a plurality of ingress packet processors of the network device and destined for a plurality of traffic managers associated with the network device, the plurality of traffic managers including the traffic manager;
- determining transmission delays associated with forwarding the packet data from the plurality of ingress packet processors to the plurality of traffic managers;
- in response to the determining, computing a time period to delay processing of the information received from the crossbar, the time period corresponding to the transmission delays;
- upon expiration of the time period, determining a total amount of packet data to be written to buffers corresponding to the plurality of traffic managers;
- comparing the total amount of packet data to at least one threshold value; and
- upon determining that the total amount of packet data is equal to or greater than the at least one threshold value:
  - dropping a portion of the packet data received by the traffic manager, and
  - writing a remaining portion of the received packet data to the one or more buffers managed by the traffic manager.

2. The network device of claim 1, wherein computing the time period to delay processing of the information received from the crossbar comprises:
- determining a maximum transmission delay associated with forwarding the packet data from the plurality of ingress packet processors to the plurality of traffic managers; and
- computing the time period to be at least equal to the maximum transmission delay.

3. The network device of claim 2, wherein determining the maximum transmission delay comprises:
- determining, for each of the plurality of traffic managers, respective transmission delays associated with forwarding the packet data from the plurality of ingress packet processors; and
- identifying, of the respective transmission delays, a greatest value as the maximum transmission delay.

4. The network device of claim 1, wherein total amount of packet data includes packet data of a plurality of traffic types, the plurality of traffic types including a first traffic type and a second traffic type,
- wherein the at least one threshold value includes a first threshold value corresponding to the first traffic type and a second threshold value corresponding to the second traffic type, the first threshold value being different from the second threshold value, and
- wherein comparing the total amount of packet data to the at least one threshold value comprises comparing the total amount of packet data to each of the first threshold value and the second threshold value.

5. The network device of claim 4, wherein the second threshold value is greater than the first threshold value, and wherein dropping a portion of the received packet data comprises:
- determining that the total amount of packet data is at least equal to the first threshold value but less than the second threshold value; and
- upon the determination, dropping received packet data of the first traffic type, and writing received packet data of other traffic types including the second traffic type, to the one or more buffers managed by the traffic manager.

6. The network device of claim 4, wherein the second threshold value is greater than the first threshold value, and wherein dropping a portion of the received packet data comprises:
- determining that the total amount of packet data is at least equal to the second threshold value; and
- upon the determination, dropping received packet data of the first traffic type and the second traffic type, and writing received packet data of other traffic types to the one or more buffers managed by the traffic manager.

7. The network device of claim 6, wherein the other traffic types are associated with one or more other threshold values that are greater than the second threshold value, and wherein the total amount of packet data is less than the one or more other threshold values.

8. The network device of claim 1, wherein information about the packet data received from the crossbar includes state information provided with each cell of packet data, each of the plurality of traffic managers, including the traffic manager, receiving state information for all cells,
- wherein upon receiving state information for all cells, the traffic manager determines the total amount of packet data to be written to the buffers corresponding to the plurality of traffic managers.

9. The network device of claim 1, wherein dropping a portion of the received packet data and writing a remaining portion of the received packet data to the one or more buffers comprise:
- determining, from the information about the packet data, traffic types of the packet data destined for the traffic manager;
- conditioned on determining that the total amount of packet data is equal to or greater than the at least one threshold value:
  - selecting traffic types to be dropped from the received packet data;
  - upon receiving the packet data, dropping received packet data of the selected traffic types; and
  - writing received packet data of other traffic types to the one or more buffers managed by the traffic manager.

10. The network device of claim 1, further comprising:
- the plurality of ingress packet processors, each receiving packets from one or more ingress ports associated with the network device; and
- the crossbar coupling the plurality of ingress packet processors to the plurality of traffic managers, wherein the crossbar is configured to:
  - receive, from one or more of the plurality of ingress packet processors, packet data to be sent to one or more of the plurality of traffic managers, wherein the packet data corresponds to one or more packets; and
  - transmit information about the packet data to the plurality of traffic managers, including the traffic manager.

11. A method comprising:
- receiving, at a traffic manager in a network device and from a crossbar associated with the network device, information about packet data received at a plurality of ingress packet processors of the network device and destined for a plurality of traffic managers associated with the network device, the plurality of traffic managers including the traffic manager;

determining, by the traffic manager, transmission delays associated with forwarding the packet data from the plurality of ingress packet processors to the plurality of traffic managers;

in response to the determining, computing, by the traffic manager, a time period to delay processing of the information received from the crossbar, the time period corresponding to the transmission delays;

upon expiration of the time period, determining, by the traffic manager, a total amount of packet data to be written to buffers corresponding to the plurality of traffic managers;

comparing, by the traffic manager, the total amount of packet data to at least one threshold value; and upon determining that the total amount of packet data is equal to or greater than the at least one threshold value:
dropping, by the traffic manager, a portion of the packet data received by the traffic manager, and
writing, by the traffic manager, a remaining portion of the received packet data to one or more buffers managed by the traffic manager.

12. The method of claim 11, wherein computing the time period to delay processing of the information received from the crossbar comprises:
determining a maximum transmission delay associated with forwarding the packet data from the plurality of ingress packet processors to the plurality of traffic managers; and
computing the time period to be at least equal to the maximum transmission delay.

13. The method of claim 12, wherein determining the maximum transmission delay comprises:
determining, for each of the plurality of traffic managers, respective transmission delays associated with forwarding the packet data from the plurality of ingress packet processors; and
identifying, of the respective transmission delays, a greatest value as the maximum transmission delay.

14. The method of claim 11, wherein total amount of packet data includes packet data of a plurality of traffic types, the plurality of traffic types including a first traffic type and a second traffic type,
wherein the at least one threshold value includes a first threshold value corresponding to the first traffic type and a second threshold value corresponding to the second traffic type, the first threshold value being different from the second threshold value, and
wherein comparing the total amount of packet data to the at least one threshold value comprises comparing the total amount of packet data to each of the first threshold value and the second threshold value.

15. The method of claim 14, wherein the second threshold value is greater than the first threshold value, and wherein dropping a portion of the received packet data comprises:
determining that the total amount of packet data is at least equal to the first threshold value but less than the second threshold value; and
upon the determination, dropping received packet data of the first traffic type, and writing received packet data of other traffic types including the second traffic type, to the one or more buffers managed by the traffic manager.

16. The method of claim 14, wherein the second threshold value is greater than the first threshold value, and wherein dropping a portion of the received packet data comprises:
determining that the total amount of packet data is at least equal to the second threshold value; and
upon the determination, dropping received packet data of the first traffic type and the second traffic type, and writing received packet data of other traffic types to the one or more buffers managed by the traffic manager.

17. The method of claim 16, wherein the other traffic types are associated with one or more other threshold values that are greater than the second threshold value, and wherein the total amount of packet data is less than the one or more other threshold values.

18. The method of claim 11, wherein information about the packet data received from the crossbar includes state information provided with each cell of packet data, wherein each of the plurality of traffic managers, including the traffic manager, receives state information for all cells, the method further comprising:
upon receiving state information for all cells, determining, by the traffic manager, the total amount of packet data to be written to the buffers corresponding to the plurality of traffic managers.

19. The method of claim 11, wherein dropping a portion of the received packet data and writing a remaining portion of the received packet data to the one or more buffers comprise:
determining, from the information about the packet data, traffic types of the packet data destined for the traffic manager;
conditioned on determining that the total amount of packet data is equal to or greater than the at least one threshold value:
selecting traffic types to be dropped from the received packet data;
upon receiving the packet data, dropping received packet data of the selected traffic types; and
writing received packet data of other traffic types to the one or more buffers managed by the traffic manager.

20. The method of claim 11, further comprising:
receiving, at the crossbar from one or more of the plurality of ingress packet processors, packet data to be sent to one or more of the plurality of traffic managers, wherein the packet data corresponds to one or more packets; and
transmitting, by the crossbar, information about the packet data to the plurality of traffic managers, including the traffic manager.

* * * * *